Dec. 13, 1955
M. M. WILEY
2,726,777
AUTOMOBILE TOWING DEVICE
Filed Oct. 20, 1951
3 Sheets-Sheet 1
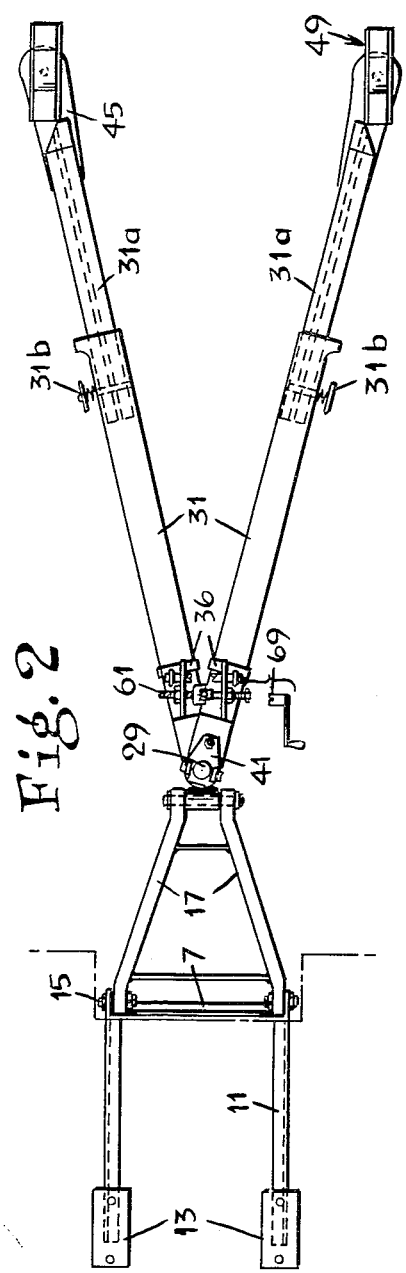
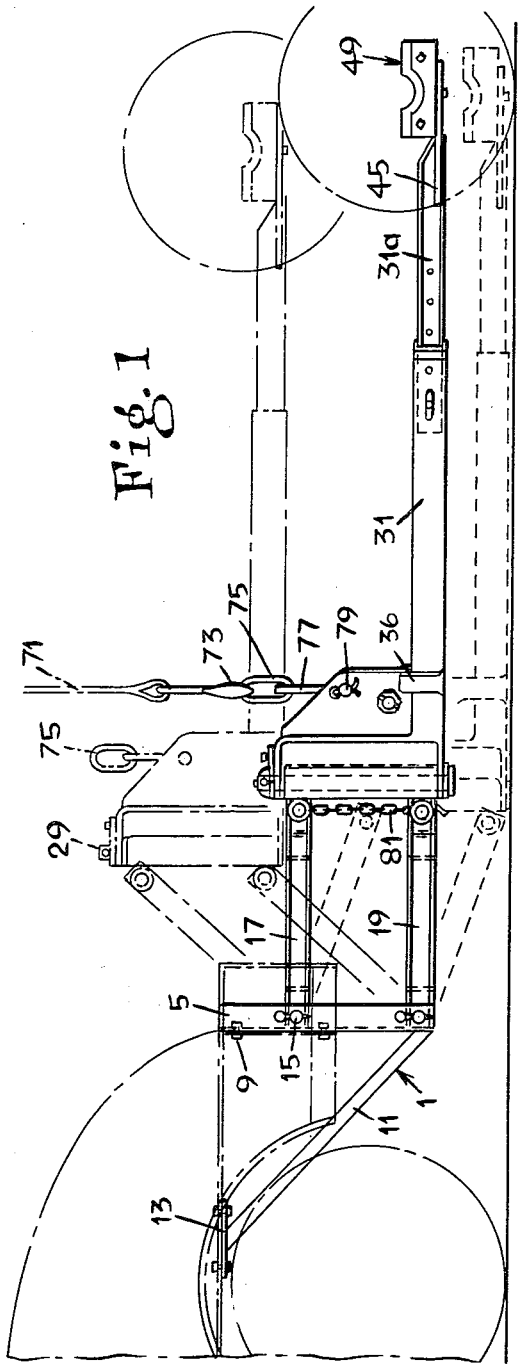
INVENTOR:
Mike M. Wiley,
BY
Ralph P. Staubly,
ATTORNEY.

Dec. 13, 1955  M. M. WILEY  2,726,777
AUTOMOBILE TOWING DEVICE
Filed Oct. 20, 1951  3 Sheets-Sheet 2
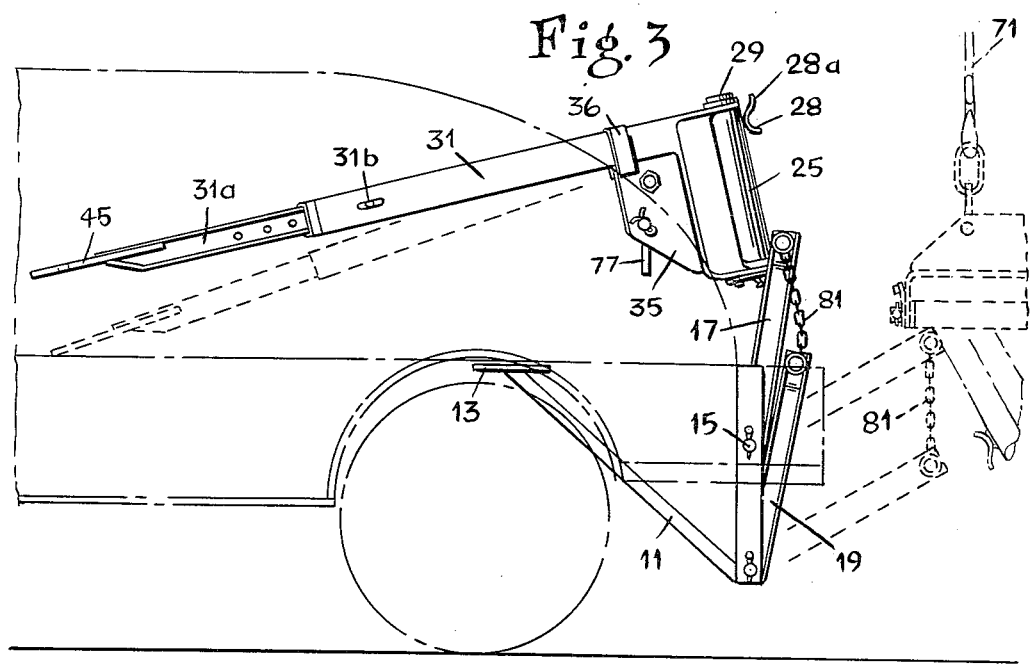
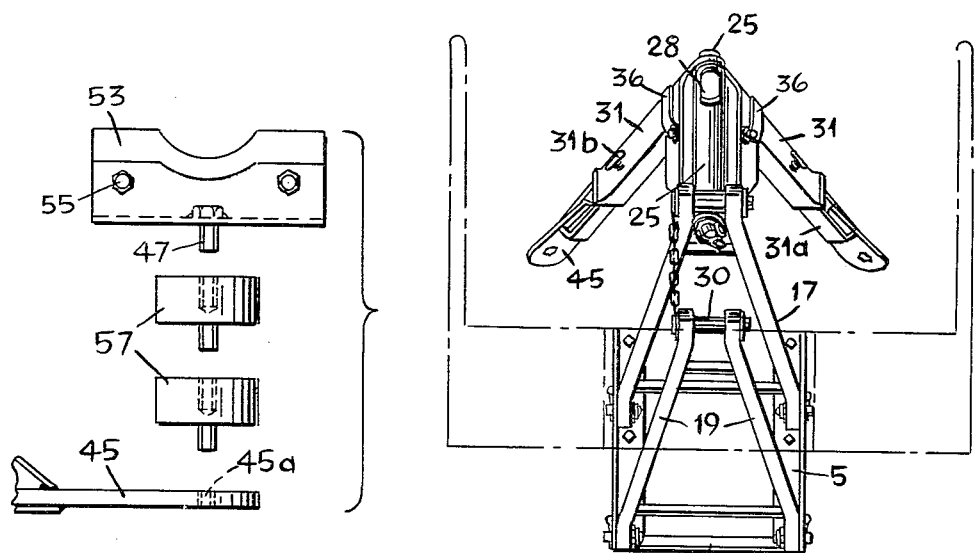
INVENTOR:
Mike M. Wiley,
BY Ralph F. Staubly,
ATTORNEY.

Dec. 13, 1955  M. M. WILEY  2,726,777
AUTOMOBILE TOWING DEVICE
Filed Oct. 20, 1951  3 Sheets-Sheet 3
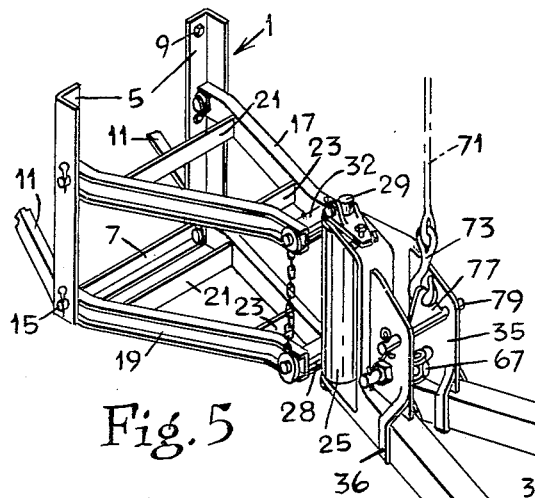
Fig. 5
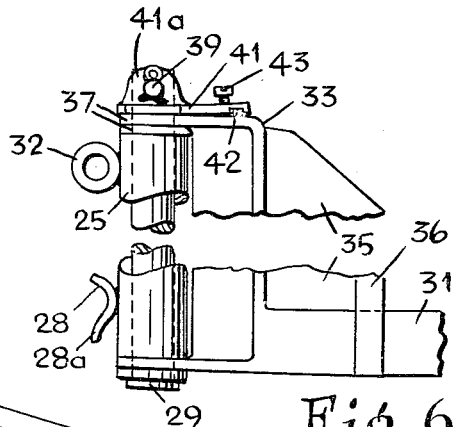
Fig. 6
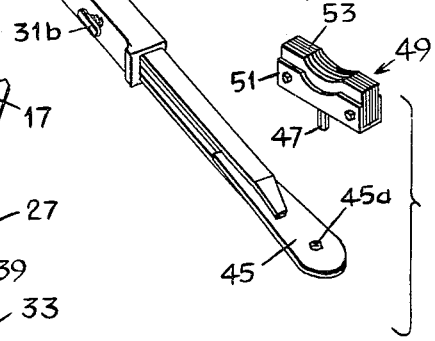
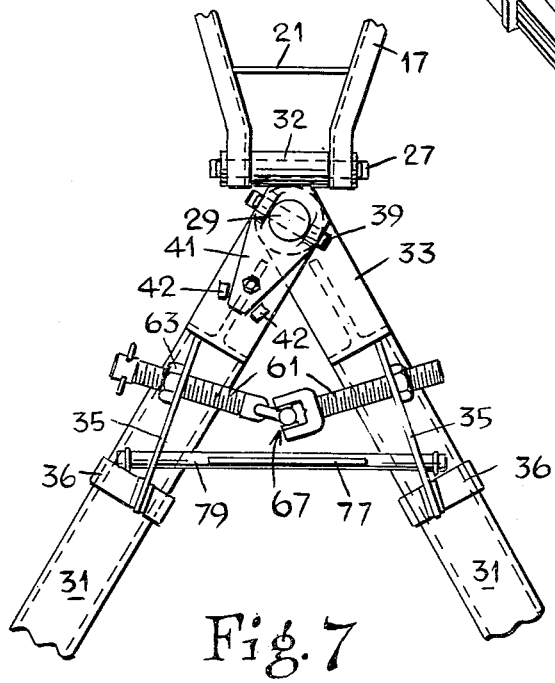
Fig. 7
INVENTOR:
Mike M. Wiley,
BY Ralph F. Staubly,
ATTORNEY

United States Patent Office 2,726,777
Patented Dec. 13, 1955

2,726,777

AUTOMOBILE TOWING DEVICE

Mike M. Wiley, Nashville, Tenn., assignor to W. T. Stringfellow and Company, Incorporated, Nashville, Tenn.

Application October 20, 1951, Serial No. 252,355

17 Claims. (Cl. 214—86)

This invention relates to improvements in automobile towing devices of the type disclosed in U. S. Patent No. 2,183,478, granted December 12, 1939, to E. W. Holmes et al.

This disclosure possesses all of the advantages of the Holmes et al. device, such as: the use-facilitating constantly substantially horizontal disposition of the lifting arms, produced by a parallelogram linkage connecting the arms to the towing truck; a good non-sway towing action produced by having said arms swing about a vertical pin connected relatively close to the rear of the truck not far behind the rear axle thereof; low tension on the lifting cable, boom and winch due to the parallelogram-produced non-amplified or equal movement of both ends of the lifting arms; and convenient semi-knockdown swinging of the lifting arms upwardly and forwardly into the towing truck for storage therein during non-use.

A principal improvement provided by this invention is a lateral relative adjustability of the lifting arms, whereby the device is more easily and more satisfactorily adaptable to the many makes and models of cars and to collision-produced disarrangement of the structures normally engaged by towing apparatus; this adjustability also almost entirely eliminates the necessity of purchasing, carrying and installing the large number of "adaptors" heretofore required. A second important improvement is the provision of means for holding the lower link of the parallelogram linkage in "make-up" position relative to the upper link, so that it will not drop to the ground; this will permit "make-up" above the ground (thus preventing muddying the apparatus, and saving work and time). A third improvement is the balanced construction of the device, whereby the arms may be winch-lifted to a relatively high level and then may be very easily manually lifted and swung up and astride the lifting cable, by which it may then be lowered into the towing truck. A fourth improvement lies in the design of the cushioned, high-friction "saddle-seats" for safe, secure and versatile lifting-engagement with the various parts of the under-structure of most automobiles. A fifth improvement lies in the simple, economical and sturdy construction resulting from the concept of having the king-pin for the towing operation also serve as the pivot pin for the lateral adjustability of the arms. A sixth improvement is the provision of a simple and effective brake for preventing lateral swinging of the arms during placement under a car.

The principal objects of the invention are to provide the improvements over the prior art enumerated in the preceding paragraph. Other objects and advantages of the invention will become apparent as the following detailed description thereof proceeds.

While a preferred embodiment of the invention will now be described, it is to be understood that the same is merely illustrative of the invention, which is capable of being varied in the side, shape, construction and arrangement of the parts without departing from the spirit of the invention, as defined by the subjoined claims.

In the drawings, in which like reference characters designate like parts in the several figures:

Fig. 1 is a side elevational view of the towing device.
Fig. 2 is a plan view of the apparatus of Fig. 1.
Fig. 3 is a side elevational view showing the device approaching storage position (shown in phantom) in the towing truck.
Fig. 4 is an end elevation of the showing of Fig. 3, viewed from the right of said figure.
Fig. 5 is an isometric view of the device of Figs. 1 and 2.
Fig. 6 is an enlarged detailed partial side elevation of the king-pin and associated structures.
Fig. 7 is a partial enlarged plan view of the brake means and of the arm-spreading and arm-lifting mechanisms.
Fig. 8 is an enlarged exploded view in elevation of a saddle and two elevating adaptors therefor.

With reference now to the drawings, Fig. 5 in particular, the numeral 1 generally designates the support structure by which the towing device is rigidly attached to a towing truck and which forms the forward vertical link of the parallelogram linkage system. The support structure 1 comprises two vertical angle bars 5 connected at their lower ends by another angle bar 7. Their upper ends may be bolted at 9, or otherwise fastened to the rear of a towing truck. Bracing rods 11 extend upwardly and forwardly from the lower ends of bars 5 and are fastened beneath the truck frame as by plates 13 (Figs. 1 and 2).

Pivotally connected to the bars 5 by pins 15 are two generally triangular link members 17 and 19, formed of channel bars and preferably cross-braced at 21 and 23.

The upper link member 17 is permanently connected at its apex to the vertical movable link member 25 by a pin 27 (Fig. 7) passing thru a horizontal bearing sleeve 32 welded to the link member 25 near its upper end. The lower link member 19 normally lies substantially parallel to the upper link member 17 and carries a pivot pin 30 which engages a trough-shaped bearing member 28, which is welded to the vertical link member 25 near its lower end. Bearing member 28 may have one or more outwardly flared lips 28a (Fig. 3), which will assist "making-up" of the linkage system when the lifting is swung from storage to use position.

The vertical link member 25 has a vertical bore to receive a king-pin 29, which serves both as the towing-pivot axis and also as the axis about which the lifting arms 31 swing in relative lateral adjustment. Each arm 31 is carried by a yoke 33 having a re-inforcing web 35, and upper and lower apertured ears 37 which span and embrace the vertical link member 25 and king-pin 29 in arm-supporting manner. The king-pin 29 has a head or other stop means at its lower end and a transverse pin 39 at its upper end to hold the yokes 33 assembled with the vertical link member 25.

Interposed between the transverse pin 39 and the upper ears 37 of the yokes 33 is a brake member 41 (Fig. 6) which may have webs 41a surrounding the pin 39, as shown, or be simply a flat apertured plate underlying said pin 39 close thereto. Lugs 42 extending upwardly from the top of the uppermost of the ears 37 of the yokes 33 serve as stops to prevent rotation of the brake plate 41 relative to the said yoke. The brake member 41 has a set-screw 43 by which it may be tilted relative to the ears 37 to apply a binding force between the ears and the ends of the vertical link member 25, which may be adjusted so as to produce merely enough friction to prevent lateral swinging of the lift arms during placement under a vehicle to be towed. The braking action must be increased as the terrain causes the king-pin to vary from the vertical, laterally of the center-line of the arms.

The arms 31 are formed of a plurality of telescoping elements, the forward portions preferably being made from rectangular tubing and the extensible rearward portions 31a being of I-beam construction. This construction, and the spring-pressed plunger device 31b by which the arms are held in adjusted length, are of conventional design.

To the end of each arm is welded a platform plate 45, having a preferably non-circular hole 45a centrally thereof. This hole receives a pin 47 (having a cross-section which permits its insertion in a plurality of rotationally adjustable positions) extending down from the bottom of a cushion-saddle member 49 (Figs. 5 and 8) adapted for resilient frictional engagement with an axle or other under-structure of a vehicle to be towed. The cushion-saddle member 49 comprises a channel-shaped metallic part 51 and a cushion 53 held therein as by bolts 55. The cushion 53 preferably has a transverse axle-embracing depression therein, and may be conveniently formed of a plurality of laminae of a tough fabric, such as conveyor-belting, set upwardly on edge in the channel part 51. The cushion-saddles 49 may be made vertically adjustable on the platform plates 45 by the use of one or more short or long adaptors 57 (Fig. 8).

The relative lateral adjustment of the lift arms may be effected by a pair of right- and left-threaded screws 61 threadedly connected to the webs 35 of the arms 31 by nuts 63 welded thereto. The screws 61 are connected intermediately of the arms by a universal joint 67. One or both of the outer ends of the screws 61 is or are adapted to receive an adjusting crank 69 (Fig. 2).

As shown in Figs. 1, 3 and 5, the arms are adapted to be lifted (while being held substantially horizontal by the operation of the linkage system) by a cable 71 connected to a conventional winch-and-boom device (not shown). The lift is applied thru a hook 73 attached to the cable 71 and engaging a hole in a web 77 which is attached to a pin 79 loosely received in the yoke webs 35. One or more links 75 may be interposed between the hook 73 and the web 77 to add flexibility to the connection for facilitating movement of the arms to and from storage position.

The pin 79 is so located vertically and horizontally of the webs 35 as to produce a balanced distribution of the mass of the arms and link members so that a minimum of manual effort is required to swing the arms to and from storage and make-up positions. It should be here noted that, in contrast to prior-art towing devices, the disclosed apparatus is lifted and swung to and from storage and use positions almost entirely by winch power.

With the present construction it is not necessary that make-up of the linkage be effected with the end of the lower link resting on the ground (an undesirable characteristic of prior-art devices of this general type), but rather it can be effected at any height within reasonable limits, as shown in Figs. 1 and 3. This is made possible by the use of a supplemental link element, which may be a chain 81 having a length approximating the vertical spacing between the axes of the pins 28 and 30.

Having thus described my invention, what I claim as new and desire to secure by Letters Patent of the United States is:

1. A towing device, comprising: a support structure adapted for rigid attachment to the rear of a towing truck; upper and lower wide-based link members horizontally pivotally connected along their bases to said support structure; an upright rear link member pivotally connected to the rear ends of said upper and lower link members to form therewith and with said support structure a parallelogram linkage system, the pivotal connection between said lower link member and said rear link member comprising a pin and an open-sided bearing-sleeve; an elongated lifting member pivotally connected to said rear link member for swinging about a vertical axis; and means for applying a lift to said rear link member and the lifting member connected thereto, said means being connected to one of said members; said linkage system holding said lifting member substantially horizontal during its up and down movement, and said pin and open-sided bearing-sleeve permitting the lifting member to be swung upwardly and forwardly over said truck body into a storage or non-use position.

2. A towing device according to claim 1 and additionally comprising at least one outwardly flared lip on said open-sided bearing-sleeve to facilitate and insure entrance of said pin thereinto during make-up of said linkage system, and stop means interconnecting said upper and lower link members for preventing said lower link member from dropping below make-up position relative to said upper and rear link members.

3. A towing device according to claim 1 and additionally comprising stop means interconnecting said upper and lower link members for preventing said lower link member from dropping below make-up position relative to said upper and rear link members.

4. A towing device according to claim 1 and in which said lifting member comprises a pair of arms vertical-pivotally connected to said rear link member for relative lateral adjustment of their rear towed-vehicle-engaging ends, said member and the arms comprising the same having a common upright pivotal axis in make-up or towing position of the parts.

5. A towing device according to claim 4 and additionally comprising adjustable means extending between said arms to hold said arms firmly in desired relative angular adjustment.

6. A towing device according to claim 5 and in which said adjustable means comprises right and left endwise connected threaded rods, threaded sockets on each arm receiving said rods, and means on one of said rods for engagement by a crank for rotating said rods.

7. A towing device according to claim 1 and in which said lifting member comprises a pair of laterally adjustable arms connected to said rear link member by a vertically spread apertured yoke on each arm and in which a king-pin attached to said link member passes through the apertures of said yokes.

8. A towing device according to claim 7 and additionally comprising an apertured brake plate loosely surrounding said king-pin and resting on one of said yokes, and adjustable means for tilting said brake plate to apply a binding pressure between the ends of the rear link member and said yokes, said adjustable means being attached to one of said brake plates and said one of said yokes.

9. A towing device according to claim 1 and in which said lifting member comprises a pair of arms having upwardly-facing concaved cushion-saddles, having their upper faces formed of a tough resilient substance of sufficient thickness to provide for relatively deep gripping embedding therein of an axle or other under structure of a towed vehicle, to receive and positively hold an axle or other part of a vehicle to be towed.

10. A towing device according to claim 9 and in which each of said cushion-saddles comprises an upwardly open metallic channel member, a plurality of laminae of a flexible and resilient fabric received on edge in and filling said channel member, a large-radius horizontal trough cut in the upper edges of said laminae transversely of said channel member, and means for attaching said cushion-saddle to the rear end of one of said arms.

11. A towing device according to claim 10 and in which said last-mentioned means for attaching said saddle comprises a non-circular lug on the bottom of said channel member and a lug-receiving socket in said arm adapted to hold said saddle in various positions of rotation about a vertical axis.

12. A towing device according to claim 11 and additionally comprising extension plug-and-socket members for adjustably raising said saddles above said arms.

13. A towing device according to claim 1 and in which said lifting member comprises a pair of lengthwise-adjustable arms, and means pivotally connecting said arms to said rear link member, whereby they may also be relatively adjusted laterally.

14. A towing device according to claim 13 and additionally comprising dished cushion-saddles attached to each arm near the rear end thereof.

15. A towing device according to claim 1 and in which said means for applying a lift to said rear link member is so located behind said link member and below its upper end as to produce a balanced distribution of mass about said means, whereby said lifting member may be manually swung without great exertion upwardly and forwardly about said means and into said truck.

16. A towing device according to claim 1 and additionally comprising dished cushion-saddles, having their upper faces formed of a tough resilient substance of sufficient thickness to provide for relatively deep gripping embedding therein of an axle or other under structure of a towed vehicle, attached to each arm near the rear end thereof.

17. A towing device, comprising: a support structure adapted for rigid attachment to the rear of a towing truck; a lifting and towing member pivotally connected to said structure and extending rearwardly therefrom; means for applying a lifting force to said member so as to cause at least its rear portion to be raised; and a plurality of laterally spaced cushion-saddles, having their upper faces formed of a tough resilient substance of sufficient thickness to provide for relatively deep gripping embedding therein of an axle or other under structure of a towed vehicle, mounted on said rear portion of said member for engagement with an axle or other understructure of a vehicle to be towed.

References Cited in the file of this patent

UNITED STATES PATENTS

| | | |
|---|---|---|
| 1,435,063 | Holmes | Nov. 7, 1922 |
| 1,520,194 | Matthews | Dec. 23, 1924 |
| 1,794,148 | Collins | Feb. 24, 1931 |
| 2,045,793 | Pearson et al. | June 30, 1936 |
| 2,183,478 | Holmes | Dec. 12, 1939 |
| 2,197,406 | Fleming et al. | Apr. 16, 1940 |
| 2,549,178 | Dear | Apr. 17, 1951 |
| 2,555,663 | Schouboe | June 5, 1951 |

FOREIGN PATENTS

| | | |
|---|---|---|
| 487,825 | Germany | Dec. 14, 1929 |